(12) United States Patent
Sorin et al.

(10) Patent No.: US 6,646,746 B1
(45) Date of Patent: Nov. 11, 2003

(54) METHOD AND SYSTEM FOR OPTICAL HETERODYNE DETECTION OF AN OPTICAL SIGNAL

(75) Inventors: Wayne V. Sorin, Mountain View, CA (US); Bogdan Szfraniec, Sunnyvale, CA (US); Douglas M. Baney, Los Altos, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 562 days.

(21) Appl. No.: 09/678,432

(22) Filed: Oct. 2, 2000

(51) Int. Cl.[7] .................................................. G01J 3/45
(52) U.S. Cl. ..................... 356/451; 398/204; 250/214 R
(58) Field of Search .................................. 398/202, 203, 398/204; 356/451; 250/214 R

(56) References Cited

U.S. PATENT DOCUMENTS

| | | | |
|---|---|---|---|
| 4,856,899 A | 8/1989 | Iwaoka et al. .............. 356/346 |
| 5,023,946 A * | 6/1991 | Yamazaki et al. .......... 398/204 |
| 5,477,369 A | 12/1995 | Mahon et al. .............. 359/189 |
| 6,256,103 B1 * | 7/2001 | Sorin et al. ................. 356/484 |
| 6,535,289 B1 * | 3/2003 | Baney et al. ................ 356/484 |
| 6,548,801 B1 * | 4/2003 | Sorin et al. ............. 250/214 R |
| 2002/0167670 A1 * | 11/2002 | Baney et al. ............... 356/451 |
| 2003/0063285 A1 * | 4/2003 | Pering et al. ............... 356/451 |

* cited by examiner

Primary Examiner—Kinfe-Michael Negash

(57) ABSTRACT

An optical heterodyne detection system in accordance with an embodiment of the invention includes two optical receivers for separately measuring the power of an input signal and a local oscillator signal before the signals are combined. The measurements of the input signal and the local oscillator signal are then utilized to enhance the heterodyne signal to noise ratio by removing the intensity noise contributed by the input signal and the local oscillator signal. By measuring portions of the input signal power and the local oscillator signal power and then subtracting out the scaled quantities from the photocurrent measurement during signal processing, the signal to noise of the heterodyne signal is improved beyond that which is accomplished by known balanced receivers.

20 Claims, 5 Drawing Sheets

METHOD AND SYSTEM FOR OPTICAL HETERODYNE DETECTION OF AN OPTICAL SIGNAL

FIELD OF THE INVENTION

The invention relates generally to the field of optical measurements and measuring systems, and more particularly to a method and system for optical heterodyne detection of an optical signal.

BACKGROUND OF THE INVENTION

Dense wavelength division multiplexing (DWDM) requires optical spectrum analyzers (OSAs) that have higher spectral resolution than is typically available with current OSAs. For example, grating based OSAs and autocorrelation based OSAs encounter mechanical constraints, such as constraints on beam size and the scanning of optical path lengths, which limit the degree of resolution that can be obtained.

As an alternative to grating based and autocorrelation based OSAs, optical heterodyne detection systems can be utilized to monitor DWDM systems. FIG. 1 is a depiction of a prior art optical heterodyne detection system. The optical heterodyne detection system includes an input signal 102, an input waveguide 104, a local oscillator signal 106, a local oscillator waveguide 108, an optical coupler 110, an output waveguide 118, an optical receiver 112, and a signal processor 116. The principles of operation of optical heterodyne detection systems are well known in the field of optical heterodyne detection and involve monitoring the heterodyne term that is generated when an input signal is combined with a local oscillator signal. Optical heterodyne detection systems are not limited by the mechanical constraints that limit the grating based and autocorrelation based OSAs. The spectral resolution of an optical heterodyne detection system is limited by the linewidth of the local oscillator signal, which can be several orders of magnitude narrower than the resolution of other OSAs.

In order to improve the performance of optical heterodyne detection systems with regard to parameters such as sensitivity and dynamic range, it is best for the heterodyne signal to have a high signal to noise ratio. However, the desired heterodyne signal coexists with other direct detection signals. The direct detection signals include intensity noise from the input signal and from the local oscillator signal that can mask the desired heterodyne signal. One technique for improving the signal to noise ratio of the heterodyne signal involves reducing the intensity noise by utilizing two detectors to accomplish balanced detection. Although balanced detection is useful in improving the signal to noise ratio for the heterodyne signal, it has limitations.

Another technique for heterodyne signal detection described in U.S. Pat. No. 4,856,899 involves amplifying the input signal before the input signal is combined with the local oscillator signal in order to increase the amplitude of the heterodyne signal. Although amplifying the input signal increases the amplitude of the heterodyne signal, the amplification also increases the intensity noise of the input signal and may not improve the signal to noise ratio of the heterodyne signal.

In view of the prior art limitations, what is needed is an optical heterodyne detection system that generates a heterodyne signal with a high signal to noise ratio.

SUMMARY OF THE INVENTION

An optical heterodyne detection system in accordance with an embodiment of the invention includes two optical receivers for separately measuring the power of an input signal and a local oscillator signal before the signals are combined. The measurements of the input signal and the local oscillator signal are then utilized to enhance the heterodyne signal to noise ratio by removing the intensity noise contributed by the input signal and the local oscillator signal. By measuring portions of the input signal power and the local oscillator signal power and then subtracting out the scaled quantities from the photocurrent measurement during signal processing, the signal to noise of the heterodyne signal is improved beyond that which is accomplished by known balanced receivers.

An embodiment of an optical heterodyne detection system includes a first receiver, an optical coupler, a heterodyne receiver, and a processor. The receiver measures a fraction of a first optical signal before the first optical signal is combined with a second optical signal and generates a first electrical signal that is representative of the measured fraction of the first optical signal where one of the first and second optical signals is a local oscillator signal and the other signal is an input signal. The optical coupler has a first input and a second input, the first input being optically connected to receive the first optical signal and the second input being optically connected to receive the second optical signal. The optical coupler has an output for outputting a combined optical signal that includes the first optical signal and the second optical signal. The a heterodyne receiver has an input for receiving the combined optical signal from the optical coupler and an output for outputting a third electrical signal that is representative of the combined optical signal. The third electrical signal includes a heterodyne signal. The processor receives the first electrical signal and the third electrical signal and generates an output signal that is indicative of an optical parameter of the input signal in response to the heterodyne signal and the first electrical signal.

In an embodiment, the processor utilizes the first electrical signal to calculate the signal noise in the third electrical signal that is contributed from the first optical signal. The processor may also subtract the calculated signal noise related to the first optical signal from the third electrical signal to improve the signal to noise ratio of the heterodyne signal.

In an embodiment, the system includes a second receiver that measures a fraction of the second optical signal before the second optical signal is combined with the first optical signal and that generates a second electrical signal that is representative of the measured fraction of the second optical signal. The processor utilizes the second electrical signal to reduce signal noise in the third electrical signal that is contributed from the second optical signal.

A method for monitoring an optical signal utilizing optical heterodyne detection involves providing a first optical signal and providing a second optical signal, with one of the first and second optical signals being a local oscillator signal and the other signal being an input signal. A fraction of the first optical signal is measured before the first optical signal is combined with the second optical signal and a first electrical signal is generated that is representative of the measured fraction of the first optical signal. The first optical signal is combined with the second optical signal to create a combined optical signal and a third electrical signal is generated that is representative of the combined optical signal. An output signal is generated that is indicative of an optical parameter of the input signal. The step of generating the output signal includes a step of utilizing the first electrical signal to reduce signal noise in the third electrical signal, wherein the signal noise is contributed from the first optical signal.

An embodiment of the method involves measuring a fraction of the second optical signal before the second optical signal is combined with the first optical signal and generating a second electrical signal that is representative of the measured fraction of the second optical signal. Additional steps involve calculating the noise that is contributed to the third electrical signal from the first optical signal utilizing the first electrical signal and subtracting the calculated noise from the third electrical signal, and calculating the noise that is contributed to the third electrical signal from the second optical signal utilizing the second electrical signal and subtracting the calculated noise from the third electrical signal.

DETAILED DESCRIPTION OF THE INVENTION

Figure 1:
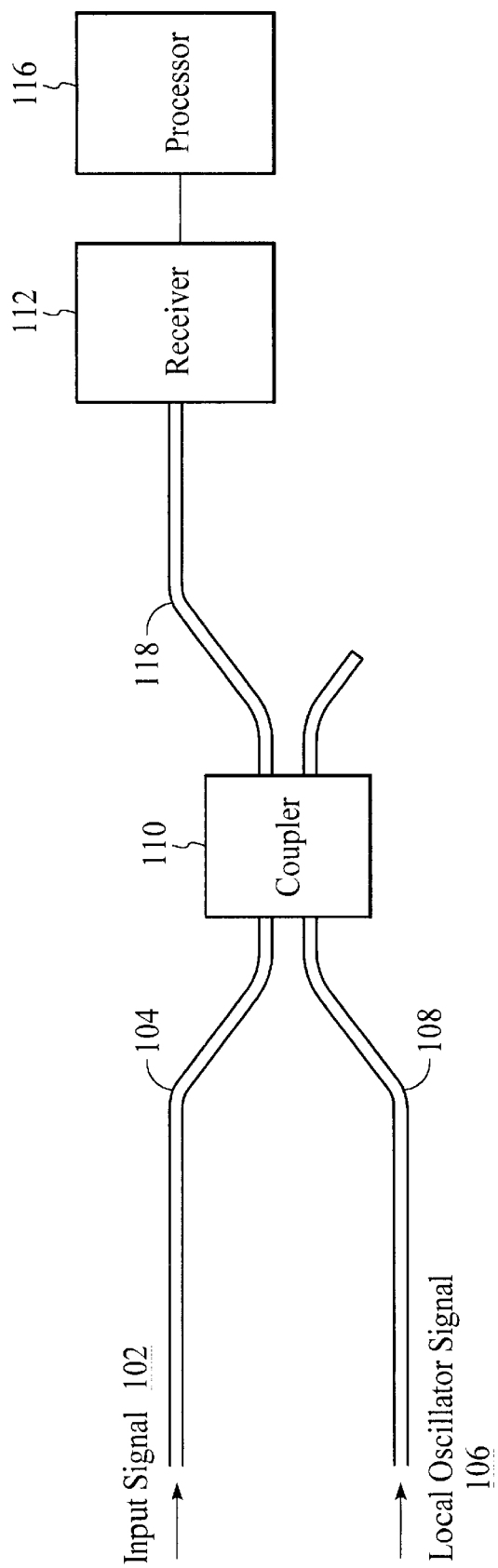
FIG. 1 is a depiction of an optical heterodyne detection system in accordance with the prior art.

An embodiment of an optical heterodyne detection system includes two optical receivers for separately measuring the power of an input signal and a local oscillator signal before the signals are combined. The measurements of the input signal and the local oscillator signal are then utilized to enhance the heterodyne signal to noise ratio by removing the intensity noise contributed by the input signal and the local oscillator signal.

As is known in the field of optical heterodyne detection, an input signal and local oscillator signal combine to create an optical signal having components that include the heterodyne signal and intensity noise from the input signal and from the local oscillator signal.

The photocurrent, i, of the signal detected by a heterodyne receiver is represented as a function of time, t, by the following equation:

$$i(t) = R[P_S(t) + P_{LO}(t) + 2\sqrt{P_S(t)P_{LO}(t)}\cos \Delta\Phi(t)]$$

where: R=detector responsivity $P_S$=optical output power of the input signal $P_{LO}$=optical output power of the local oscillator signal $\Phi$=phase of the optical signal The $2\sqrt{P_S(t)P_{LO}(t)}\cos \Delta\Phi(t)$ term of the photocurrent equation represents the desired heterodyne signal that is utilized for optical spectrum analysis. The $P_S(t)$ and $P_{LO}(t)$ terms of the photocurrent equation correspond to the direct intensity detection of the input signal and the local oscillator signal, respectively. The signal to noise ratio of the heterodyne signal is improved when the photocurrent intensity contributed from the direct detection of the input signal and the local oscillator signal are minimized. That is, in order to improve the signal to noise ratio of the heterodyne term, it is desirable to minimize the portion of the photocurrent that is contributed from direct detection of the input signal and the local oscillator signal.

In accordance with an embodiment of the invention, portions of the input signal power ($\propto P_S(t)$) and the local oscillator signal power ($\propto P_{LO}(t)$) are separately measured before the signals are combined. The measured portions of the input signal power and the local oscillator signal power are scaled to represent the entire input signal power ($P_S(t)$) and local oscillator signal power ($P_{LO}(t)$) and the scaled measurements are utilized during signal processing to subtract the undesired noise from the photocurrent measurement i(t) that is made by the heterodyne receiver. That is, a portion of the input signal power and the local oscillator signal power are measured, the corresponding terms $P_S(t)$ and $P_{LO}(t)$ are calculated from the measured quantities and the calculated $P_S(t)$ and $P_{LO}(t)$ terms are subtracted from the photocurrent i(t) measurement. By measuring portions of the input signal power and the local oscillator signal power and then subtracting out the scaled quantities from the photocurrent measurement during signal processing, the signal to noise of the heterodyne signal is improved beyond that which is accomplished by known balanced receivers.

Figure 2:
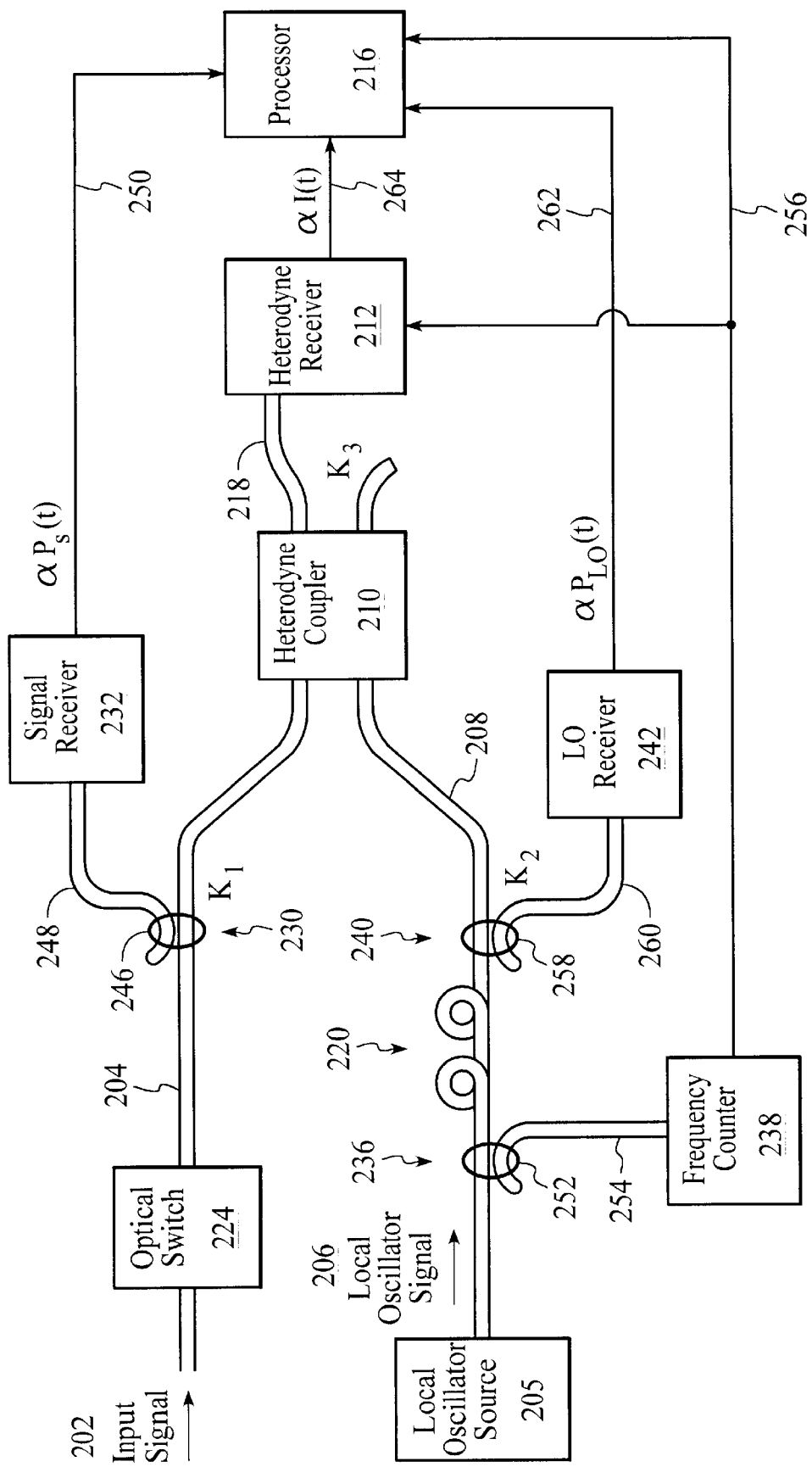
FIG. 2 is a depiction of an optical heterodyne detection system with one output fiber that includes two receivers for measuring the power of the input signal and the local oscillator signal in accordance with an embodiment of the invention.

FIG. 2 is a depiction of an optical heterodyne detection system in which the input signal power and local oscillator signal power are separately measured and the resulting measurements are utilized during signal processing to improve the signal to noise ratio of the heterodyne signal. The optical heterodyne detection system includes a signal fiber 204, an optical switch 224, a signal tap 230, a signal receiver 232, a local oscillator source 205, a local oscillator fiber 208, a frequency counter tap 236, a frequency counter 238, a polarization controller 220, a local oscillator tap 240, a local oscillator receiver 242, a heterodyne coupler 210, a heterodyne receiver 212, and a processor 216. It should be noted that throughout the description, similar reference numerals are utilized to identify similar elements.

The signal fiber 204 carries an input signal that is to be detected by the system. In an embodiment, the signal fiber is a single mode optical fiber as is known in the field, although other optical waveguides may be utilized. In addition, although waveguides are described, optical signals may be input into the system, or transmitted within the system, in free space.

The input signal 202 includes optical signals that are generated from conventional devices as is known in the field of optical communications systems. For example, the input signal may be generated from a single laser or multiple lasers and may consist of a single wavelength or multiple wavelengths as is known in the field of wavelength division multiplexing. The input signal may be an optical signal having unknown optical characteristics, in which case the optical heterodyne detection system can be utilized for optical spectrum analysis. The input signal may alternatively be an optical signal that is input with known optical characteristics, in which case the optical heterodyne detection system can be utilized for optical network analysis. In an embodiment, a known input signal may be a delayed portion of the local oscillator signal.

When the monitoring system is utilized for optical network or component analysis, the characteristics of a network or a single component can be determined by inputting a known input signal into the network or the single component and then measuring the response to the known signal.

The optical switch 224 is integrated into the signal fiber 204. The optical switch is an optional component that allows the input signal to be completely blocked in order to calibrate components of the system. Calibration of the optical heterodyne detection system is described in more detail below. The particular type of optical switch is not critical and therefore various types of optical switches as are known in the field of optical communications may be utilized.

The signal tap 230 is integrated into the signal fiber 204 before the heterodyne coupler. The signal tap diverts a fraction of the input signal 202 to the signal receiver 232. In an embodiment, the signal tap includes an optical coupler 246 and a tap fiber 248.

The signal receiver 232 is optically connected to the signal tap 230 to measure the power of the input signal 202 before the input signal is combined with the local oscillator signal 206. The signal receiver transmits the input signal measurement to the processor 216 through an electrical connection 250 between the signal receiver and the processor. Because the signal receiver measures only a fraction of the input signal, the measurement of the input signal must be scaled to represent the actual input signal power ($P_S(t)$). Scaling of the input signal measurement is preferably performed by the processor although the scaling calculation can be performed by other systems.

The local oscillator source 205 generates a local oscillator signal. In an embodiment, the local oscillator source is a wideband tunable laser that is tunable over a wavelength range of one nanometer or greater. During optical spectrum analysis, the local oscillator source generates a local oscillator signal that is swept across a range of frequencies, or wavelengths, in order to detect the input signal over the range of frequencies or wavelengths.

The local oscillator fiber 208 is an optical fiber, such as a single mode optical fiber, that carries the local oscillator signal 206. The local oscillator fiber may include a polarization controller 220 that controls the polarization state of the local oscillator signal. Other optical waveguides may be utilized in place of single mode optical fiber, such as polarization preserving fiber. Alternatively, the local oscillator signal may be transmitted into the system through free space without the use of a waveguide.

The frequency counter tap 236 is located between the local oscillator source 205 and the heterodyne coupler 210. The frequency counter tap diverts a fraction of the local oscillator signal 206 to the frequency counter 238. In an embodiment, the frequency counter tap includes an optical coupler 252 and a tap fiber 254.

The frequency counter 238 is optically connected to the frequency counter tap 236 to measure the frequency (alternatively referred to in terms of wavelength) of the local oscillator signal 206 that is generated by the local oscillator source 205.

Preferably, the frequency counter obtains a real-time measure of the frequency of the local oscillator signal as the local oscillator signal is swept across a range of frequencies. The frequency counter outputs instantaneous frequency information, through an electrical connection 256, to one or both of the heterodyne receiver 212 and the processor 216 for use in optical spectrum analysis. The instantaneous frequency information for the swept local oscillator is used to determine the local oscillator frequency at which the heterodyne signal is detected. Frequency counters are known in the field of optical communications and are not described further. Although a frequency counter tap and frequency counter are depicted in the embodiment of FIG. 2, it should be understood that frequency information may be provided from another source such as the local oscillator source itself.

The local oscillator tap 240 is integrated into the local oscillator fiber 208 between the local oscillator source 205 and the heterodyne coupler 210. The local oscillator tap diverts a fraction of the local oscillator signal 206 to the local oscillator receiver 242. In an embodiment, the local oscillator tap includes an optical coupler 258 and a tap fiber 260.

The local oscillator receiver 242 is optically connected to the local oscillator tap 240 to measure the power of the local oscillator signal 206 before the local oscillator signal is combined with the input signal 202. Because the local oscillator receiver measures only a fraction of the local oscillator signal, the measurement of the local oscillator signal must be scaled to represent the actual local oscillator signal power ($P_{LO}(t)$). Scaling of the local oscillator signal measurement is preferably performed by the processor although the scaling calculation can be performed by another system or systems. The local oscillator receiver transmits the local oscillator signal measurement to the processor 216 through an electrical connection 262 between the local oscillator receiver and the processor.

The heterodyne coupler 210 combines the input signal 202 and the local oscillator signal 206 onto a common waveguide. As shown in FIG. 2, the heterodyne coupler combines the input signal and the local oscillator signal and distributes the combined optical signal into an output fiber 218. Although only one output fiber is shown in FIG. 2, more than one output fiber can be utilized to transmit a portion of the combined optical signal to the optical receiver. An embodiment of the optical heterodyne detection system that includes two output fibers is described below with reference to FIG. 3.

The heterodyne coupler 210 may be an optically directional 3 dB fiber coupler, although other optical couplers may be utilized. In an embodiment, the optical coupler is substantially independent of the polarization of the input signal 202 and the local oscillator signal 206. In an embodiment, the optical coupler does not polarize the combined optical signal.

The output fiber 218 connected to the optical coupler 210 carries the combined optical signal to the heterodyne receiver 212. Other optical waveguides may be utilized in place of the single mode optical fiber. Alternatively, the combined optical signal may be transmitted to the optical receiver through free space without the use of a waveguide.

The heterodyne receiver 212 is connected to receive the combined optical signal from the optical coupler 210 and generates an electrical signal in response to the combined optical signal. Although not shown, the optical receiver may include photodetectors, signal amplifiers, and filters, as is known in the field. The electrical signal generated by the heterodyne receiver 212 is provided to the processor 216 via an electrical connection 264. As an alternative to a photodetector based optical receiver, the heterodyne receiver may utilize other detection devices, such as a non-linear mixing element.

The processor 216 includes a multifunction processor that receives the electrical signals from the heterodyne receiver 212, the signal receiver 232, the local oscillator receiver 242, and the frequency counter 238 and isolates the heterodyne term from the heterodyne receiver to generate an output signal that is indicative of an optical parameter of the input signal 202. The processor may include either or both analog signal processing circuitry and digital signal processing circuitry, as is known in the field of electrical signal processing. In an embodiment, analog signals from the receivers are converted into digital signals and the digital signals are subsequently processed to generate an output signal.

In operation, an input signal 202 propagates through the input fiber 204 towards the heterodyne coupler 210. A fraction of the input signal is diverted by the signal tap 230 and detected by the signal receiver 232. An electrical signal representative of the input signal power is transmitted to the processor 216 via the electrical connection 250.

Simultaneously, the swept local oscillator signal 206 generated by the local oscillator source 205 propagates through the local oscillator fiber 208 towards the heterodyne coupler 210. A fraction of the local oscillator signal is diverted by the frequency counter tap 236 and detected by the frequency counter 238. A real-time measure of the local oscillator frequency is transmitted to the processor 216 via the electrical connection 256. Another fraction of the swept local oscillator signal is diverted by the local oscillator tap 240 and detected by the local oscillator receiver 242. An electrical signal representative of the local oscillator signal power is transmitted to the processor via the electrical connection 262.

The remaining portions of the input signal 202 and the swept local oscillator signal 206 are combined by the heterodyne coupler 210 into a combined optical signal. The combined optical signal is output onto output fiber 218 and transmitted to the heterodyne receiver 212. The combined optical signal is detected by the heterodyne receiver and an electrical signal, i(t), is generated in response to the combined optical signal. The electrical signal is processed by the processor 216 to isolate the heterodyne signal. The heterodyne signal generated from the combination of the input signal and the local oscillator signal is monitored to determine an optical parameter of the input signal, such as wavelength, frequency, or amplitude.

As described above, signal processing performed by the processor 216 involves calculating the total power terms $P_S(t)$ and $P_{LO}(t)$ by scaling the power measurements of the input signal 202 and the swept local oscillator signal 206 and then subtracting the scaled measurements from the signal that is generated in response to the combined optical signal.

Although the system of FIG. 2 is described as having a signal tap and receiver for both the input signal 202 and the local oscillator signal 206, an alternative embodiment of the system may include only one signal tap and receiver. For example if the input signal is the dominant source of noise, significant noise reduction may be accomplished by measuring only the input signal power and performing the related subtraction on only the input signal noise.

Figure 3:
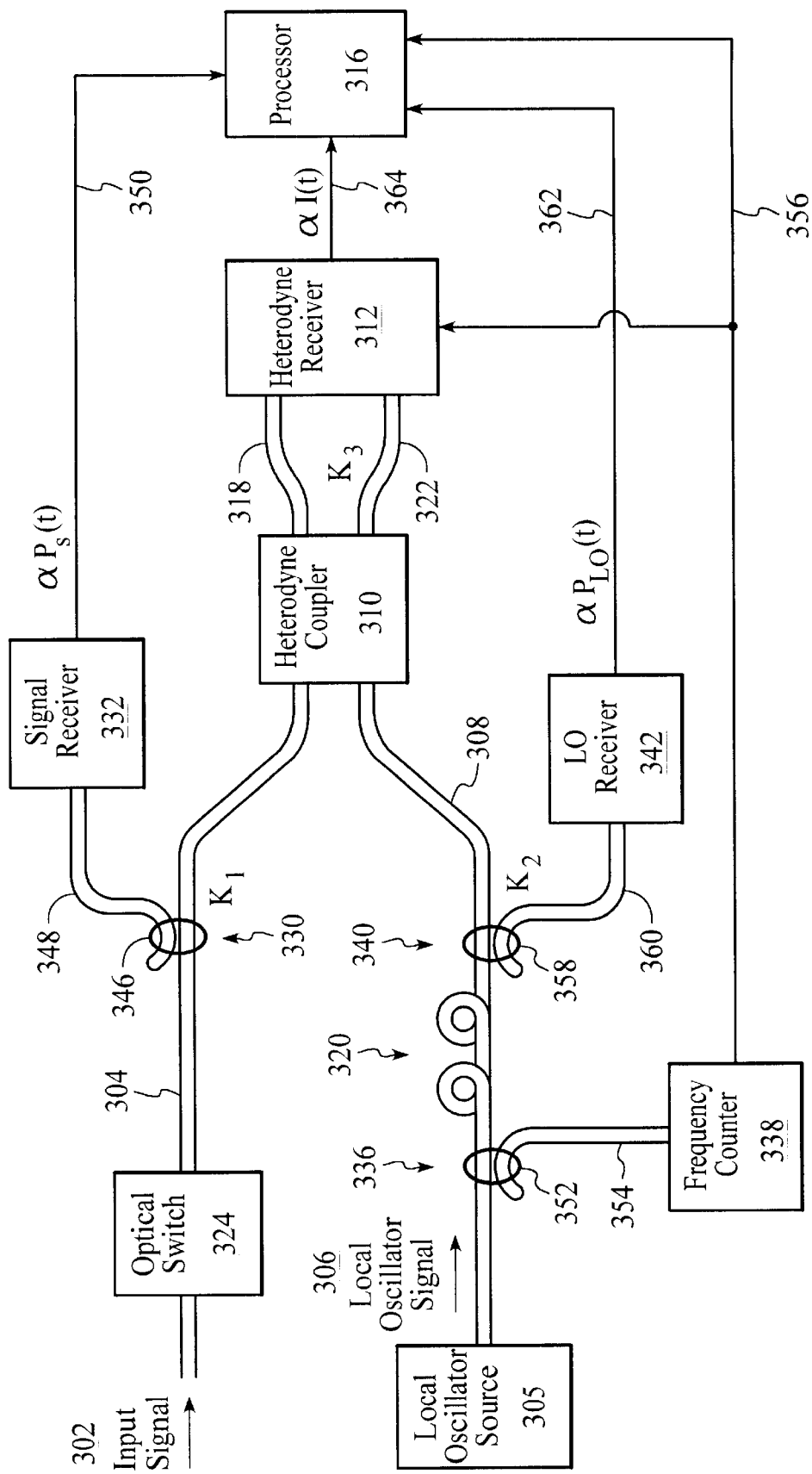
FIG. 3 is a depiction of an optical heterodyne detection system with two output fibers that includes two receivers for measuring the power of the input signal and the local oscillator signal in accordance with an embodiment of the invention.

FIG. 3 is a depiction of another embodiment of an optical heterodyne detection system that involves measuring a fraction of the input signal 302 and the local oscillator signal 306. The system of FIG. 3 includes two output fibers 318 and 322 that carry the combined optical signal to the heterodyne receiver 312. As is known in the field of optical heterodyne detection systems, the heterodyne receiver and the processor 316, shown in FIG. 3, can be utilized in conjunction with the two combined optical signals on fibers 318 and 322 to generate an output signal that is independent of the polarization state of the input signal and that is balanced with regard to the intensity noise component of the combined optical signal.

A method for monitoring an optical signal utilizing optical heterodyne detection is described herein and depicted in the process flow diagrams of FIGS. 4A–4D. In a step 402, a first optical signal is provided. In a step 404, a second optical signal is provided, with one of the first and second optical signals being a local oscillator signal and the other signal being an input signal. In a step 406, a fraction of the first optical signal is measured before the first optical signal is combined with the second optical signal. In a step 408, a first electrical signal that is representative of the measured fraction of the first optical signal is generated. In a step 410, the first optical signal is combined with the second optical signal to create a combined optical signal. In a step 412, a third electrical signal that is representative of the combined optical signal is generated. In a step 414, an output signal that is indicative of an optical parameter of the input signal is generated by using the first electrical signal to reduce signal noise contributed by the first optical signal in the third electrical signal.

Figure 4A:
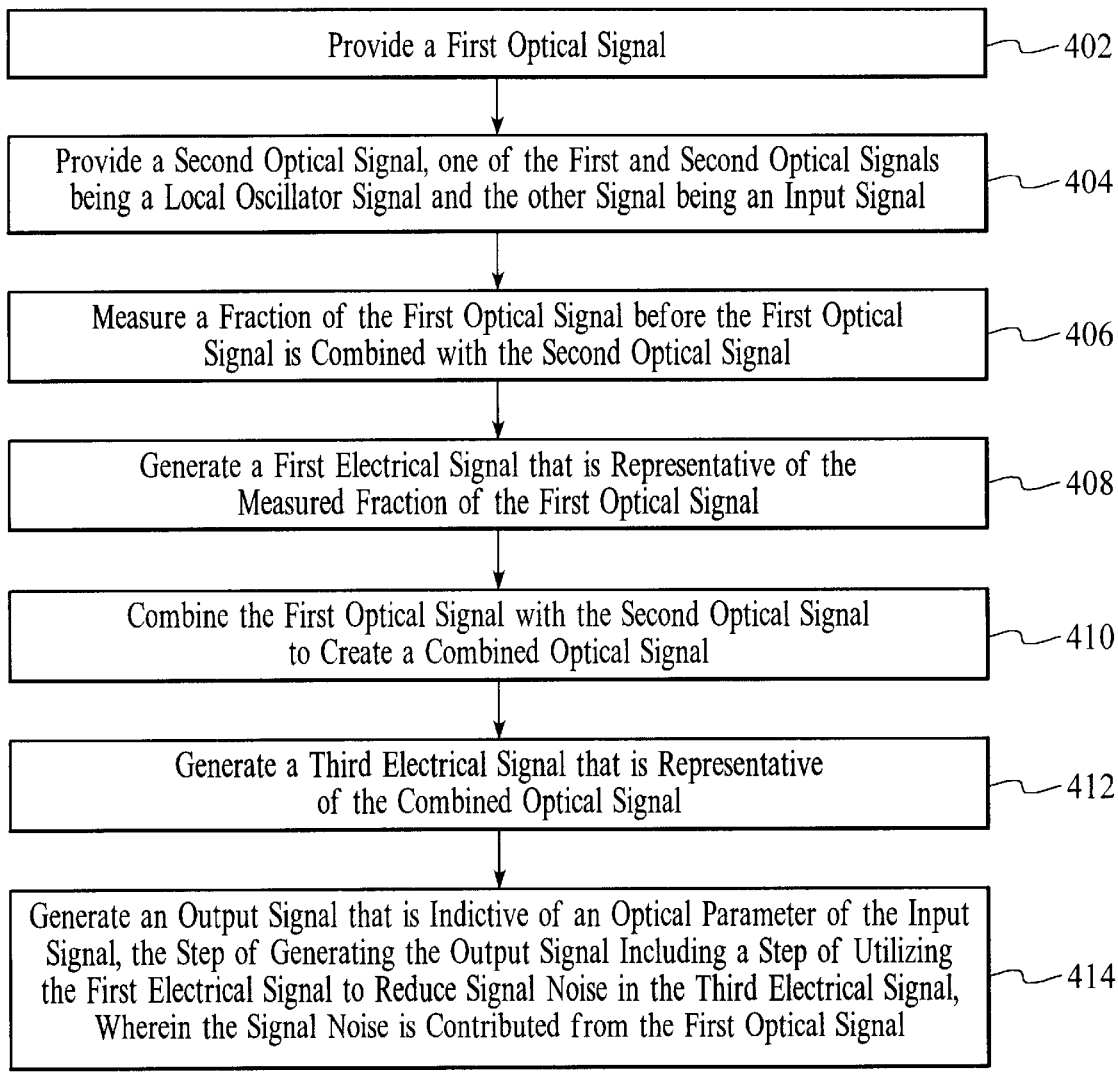
FIG. 4A is a process flow diagram of a method for monitoring an optical signal utilizing optical heterodyne detection in accordance with an embodiment of the invention.
Figure 4B:
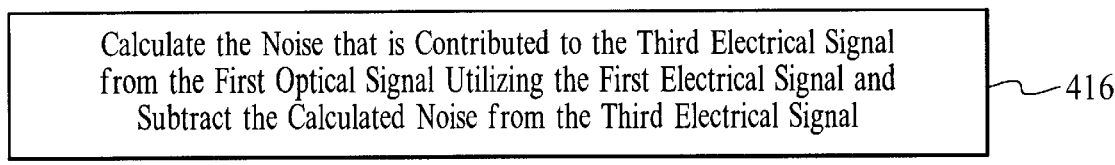
FIG. 4B includes an additional process step that is related to the process flow diagram of FIG. 4A.

In an embodiment, the method of FIG. 4A includes an additional step 416, shown in FIG. 4B, of calculating the noise that is contributed to the third electrical signal from the first optical signal utilizing the first electrical signal and subtracting the calculated noise from the third electrical signal.

Figure 4C:
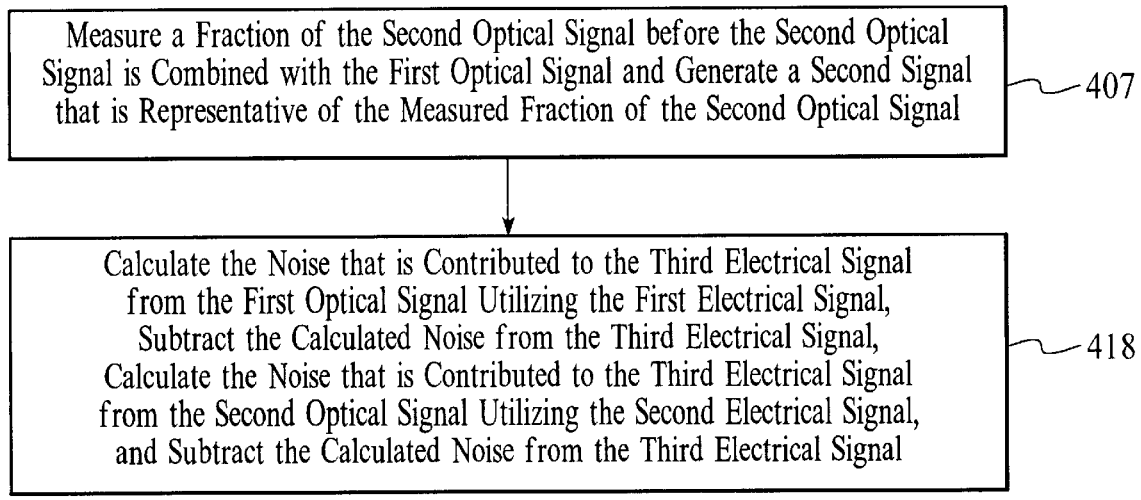
FIG. 4C includes additional process steps that are related to the process flow diagram of FIG. 4A.

In an embodiment, the method of FIG. 4A includes an additional step 407, shown in FIG. 4C, of measuring a fraction of the second optical signal before the second optical signal is combined with the first optical signal and generating a second electrical signal that is representative of the measured fraction of the second optical signal. An additional step 418, involves calculating the noise that is contributed to the third electrical signal from the first optical signal utilizing the first electrical signal, subtracting the calculated noise from the third electrical signal, calculating the noise that is contributed to the third electrical signal from the second optical signal utilizing the second electrical signal, and subtracting the calculated noise from the third electrical signal.

Figure 4D:
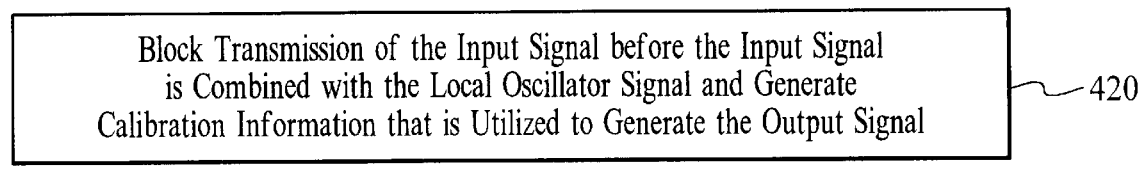
FIG. 4D includes an additional process step that is related to the process flow diagram of FIG. 4A.

In an embodiment, the method of FIG. 4A includes an additional step 420, shown in FIG. 4D, of blocking transmission of the input signal before the input signal is combined with the local oscillator signal and generating calibration information that is utilized to generate the output signal.

In order to obtain accurate measurements from the above-described optical heterodyne detection systems and method, it may be necessary to calibrate some of the system devices. Referring back to FIG. 2 as an example, calibration of the system can be accomplished by utilizing the optical switch 224 to block transmission of the input signal 202. For example, with the input signal completely blocked from transmission by the optical switch, the coupling coefficient of the heterodyne coupler 210 and the local oscillator tap coupler 258 can be determined as a function of wavelength by sweeping the local oscillator signal 206 across a range of wavelengths. In addition, the responsivity of the heterodyne receiver 212 and the local oscillator receiver 242 can be determined as a function of wavelength by sweeping the local oscillator signal while the input signal is completely blocked. The coupling coefficient of the signal tap coupler 246 can be determined by turning off the local oscillator signal source 205 and allowing only the input signal 202 into the optical heterodyne detection system.

With reference to the monitoring system of FIG. 3, the distribution of the local oscillator signal 306 into the receiver 312 can be determined as a function of wavelength by sweeping the local oscillator signal while the input signal 302 is completely blocked by the optical switch 324. It is preferable that the local oscillator signal is approximately evenly distributed among the output fibers 318 and 322 when providing polarization diversity detection. If the local oscillator signal is not evenly distributed among the output fibers then the power distribution of the local oscillator signal may be adjusted utilizing the polarization controller 320.

Although the optical components of the optical heterodyne detection system are described as being connected by optical fibers, the individual devices may be integrated onto a monolithic device, such as a planar waveguide circuit. Alternatively, the optical elements may be connected by free space.

What is claimed is:

1. A system for optical heterodyne detection comprising:
   means for measuring a fraction of a first optical signal before said first optical signal is combined with a second optical signal and for generating a first electrical signal that is representative of said measured fraction of said first optical signal, one of said first and second optical signals being a local oscillator signal and the other signal being an input signal;
   an optical coupler having a first input and a second input, said first input being optically connected to receive said first optical signal, said second input being optically connected to receive said second optical signal, said optical coupler having an output for outputting a combined optical signal that includes said first optical signal and said second optical signal;
   a heterodyne receiver having an input for receiving said combined optical signal from said optical coupler and an output for outputting a third electrical signal that is representative of said combined optical signal, said third electrical signal including a heterodyne signal; and
   a processor for receiving said first electrical signal and said third electrical signal, and for generating an output signal that is indicative of an optical parameter of said input signal in response to said heterodyne signal and said first electrical signal.

2. The system of claim 1 wherein said processor includes means for utilizing said first electrical signal to reduce signal noise in said third electrical signal that is contributed from said first optical signal.

3. The system of claim 2 wherein said processor includes means for utilizing said first electrical signal to calculate the signal noise in said third electrical signal that is contributed from said first optical signal.

4. The system of claim 3 wherein said processor further includes means for subtracting said calculated signal noise related to said first optical signal from said third electrical signal to improve the signal to noise ratio of said heterodyne signal.

5. The system of claim 1 further including a frequency counter connected to receive a fraction of said local oscillator signal before said local oscillator signal is received by said optical coupler, said frequency counter being connected to transmit a measure of the frequency of said local oscillator signal to said processor.

6. The system of claim 1 further including means for measuring a fraction of said second optical signal before said second optical signal is combined with said first optical signal and for generating a second electrical signal that is representative of said measured fraction of said second optical signal, said processor further including means for utilizing said second electrical signal to reduce signal noise in said third electrical signal that is contributed from said second optical signal.

7. The system of claim 1 wherein said optical coupler further includes a second output for outputting a portion of said combined optical signal to said optical receiver, said optical receiver enabling said output signal to be independent of the polarization state of said input signal and balanced with regard to intensity noise of said combined optical signal.

8. The system of claim 1 further including an optical switch associated with said input signal for blocking said input signal in an optical path that is upstream from said optical coupler.

9. A system for optical heterodyne detection comprising:
   means for measuring a fraction of an input signal before said input signal is combined with a local oscillator signal and for generating a first electrical signal that is representative of said measured fraction of said input signal;
   means for measuring a fraction of said local oscillator signal before said local oscillator signal is combined with said input signal and for generating a second electrical signal that is representative of said measured fraction of said local oscillator signal;
   an optical coupler having a first input and a second input, said first input being optically connected to receive said input signal, said second input being optically connected to receive said local oscillator signal, said optical coupler having an output for outputting a combined optical signal that includes said input signal and said local oscillator signal;
   a heterodyne receiver having an input for receiving said combined optical signal from said optical coupler and an output for outputting a third electrical signal that is representative of said combined optical signal, said third electrical signal including a heterodyne signal; and
   a processor for receiving said first electrical signal, said second electrical signal, and said third electrical signal, and for generating an output signal that is indicative of an optical parameter of said input signal in response to said heterodyne signal and said first electrical signal.

10. The system of claim 9 wherein said processor includes means for utilizing said first electrical signal and said second electrical signal to reduce signal noise in said third electrical signal that is contributed from said input signal and said local oscillator signal, respectively.

11. The system of claim 9 wherein said processor includes means for utilizing said first electrical signal to calculate the signal noise in said third electrical signal that is contributed from said input signal and for utilizing said second electrical signal to calculate the signal noise in said third electrical signal that is contributed from said local oscillator signal.

12. The system of claim 11 wherein said processor further includes means for subtracting said calculated signal noise related to said input signal and said calculated signal noise related to said local oscillator signal from said third electrical signal to improve the signal to noise ratio of said heterodyne signal.

13. The system of claim 12 further including a frequency counter connected to receive a portion of said local oscillator signal before said local oscillator signal is received by said optical coupler, said frequency counter being connected to transmit a measure of the frequency of said local oscillator signal to said processor in order to determine the frequency at which the heterodyne term is detected.

14. A method for monitoring an optical signal utilizing optical heterodyne detection, comprising steps of:

provic a first optical signal;

providing a second optical signal, one of said first and second optical signals being a local oscillator signal and the other signal being an input signal;

measuring a fraction of said first optical signal before said first optical signal is combined with said second optical signal;

generating a first electrical signal that is representative of said measured fraction of said first optical signal;

combining said first optical signal with said second optical signal to create a combined optical signal;

generating a third electrical signal that is representative of said combined optical signal; and generating an output signal that is indicative of an optical parameter of said input signal, said step of generating said output signal including a step of utilizing said first electrical signal to reduce signal noise in said third electrical signal, wherein said signal noise is contributed from said first optical signal.

15. The method of claim 14 wherein said step of utilizing said first electrical signal to reduce said signal noise includes a step of calculating the noise that is contributed to said third electrical signal from said first optical signal utilizing said first electrical signal and subtracting said calculated noise from said third electrical signal.

16. The method of claim 14 further including the steps of:

measuring a fraction of said second optical signal before said second optical signal is combined with said first optical signal; and generating a second electrical signal that is representative of said measured fraction of said second optical signal.

17. The method of claim 16 further including steps of:

calculating the noise that is contributed to said third electrical signal from said first optical signal utilizing said first electrical signal and subtracting said calculated noise from said third electrical signal; and calculating the noise that is contributed to said third electrical signal from said second optical signal utilizing said second electrical signal and subtracting said calculated noise from said third electrical signal.

18. The method of claim 14 wherein said step of generating said output signal includes monitoring a heterodyne signal that is a component of said combined optical signal.

19. The method of claim 14 further including the steps of:

blocking transmission of said input signal before said input signal is combined with said local oscillator signal; and generating calibration information that is utilized to generate said output signal.

20. The method of claim 14 further including a step of sweeping said local oscillator signal across a range of wavelengths in order to monitor said heterodyne signal.

* * * * *